United States Patent Office 3,535,570
Patented Oct. 20, 1970

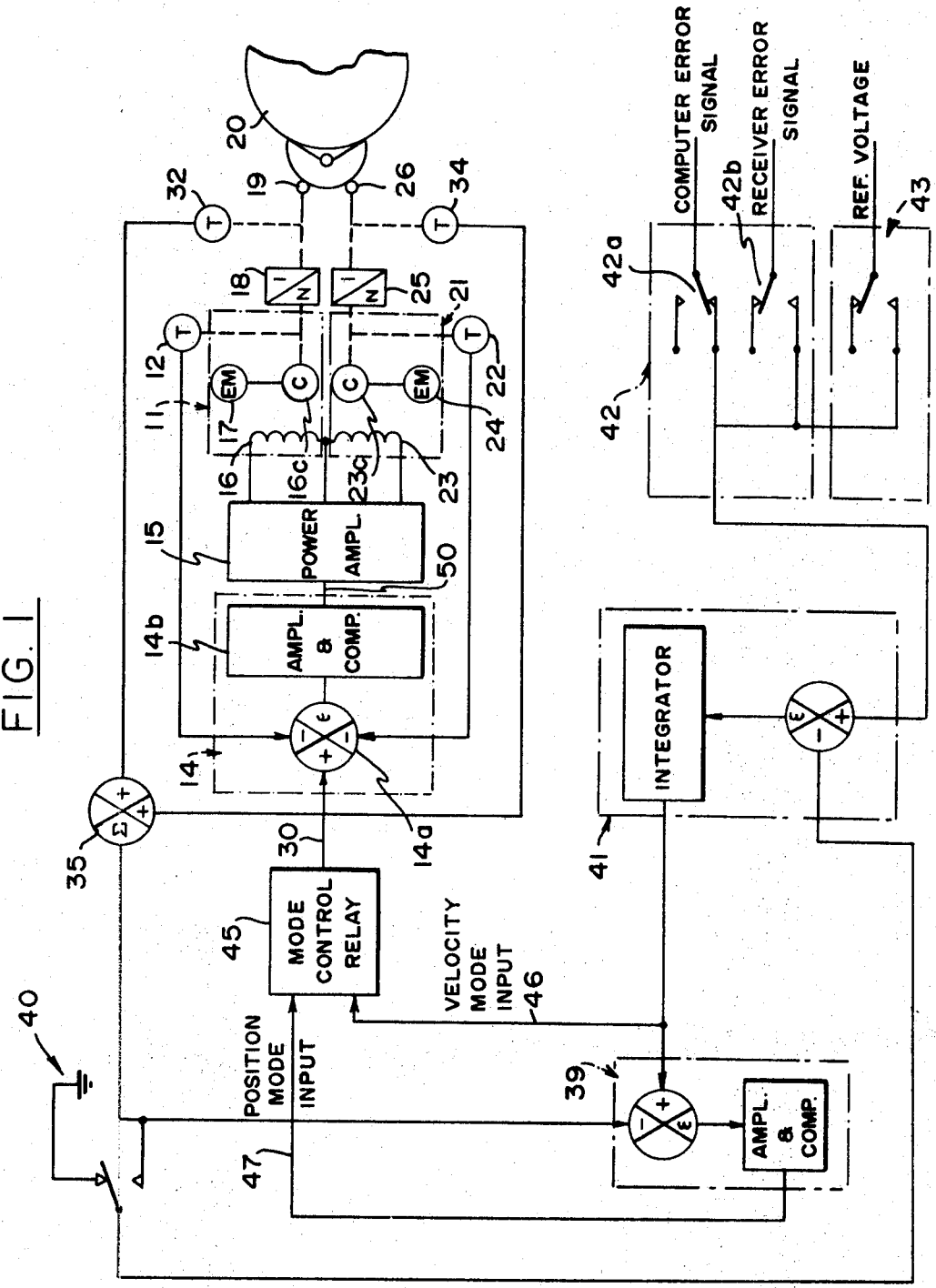

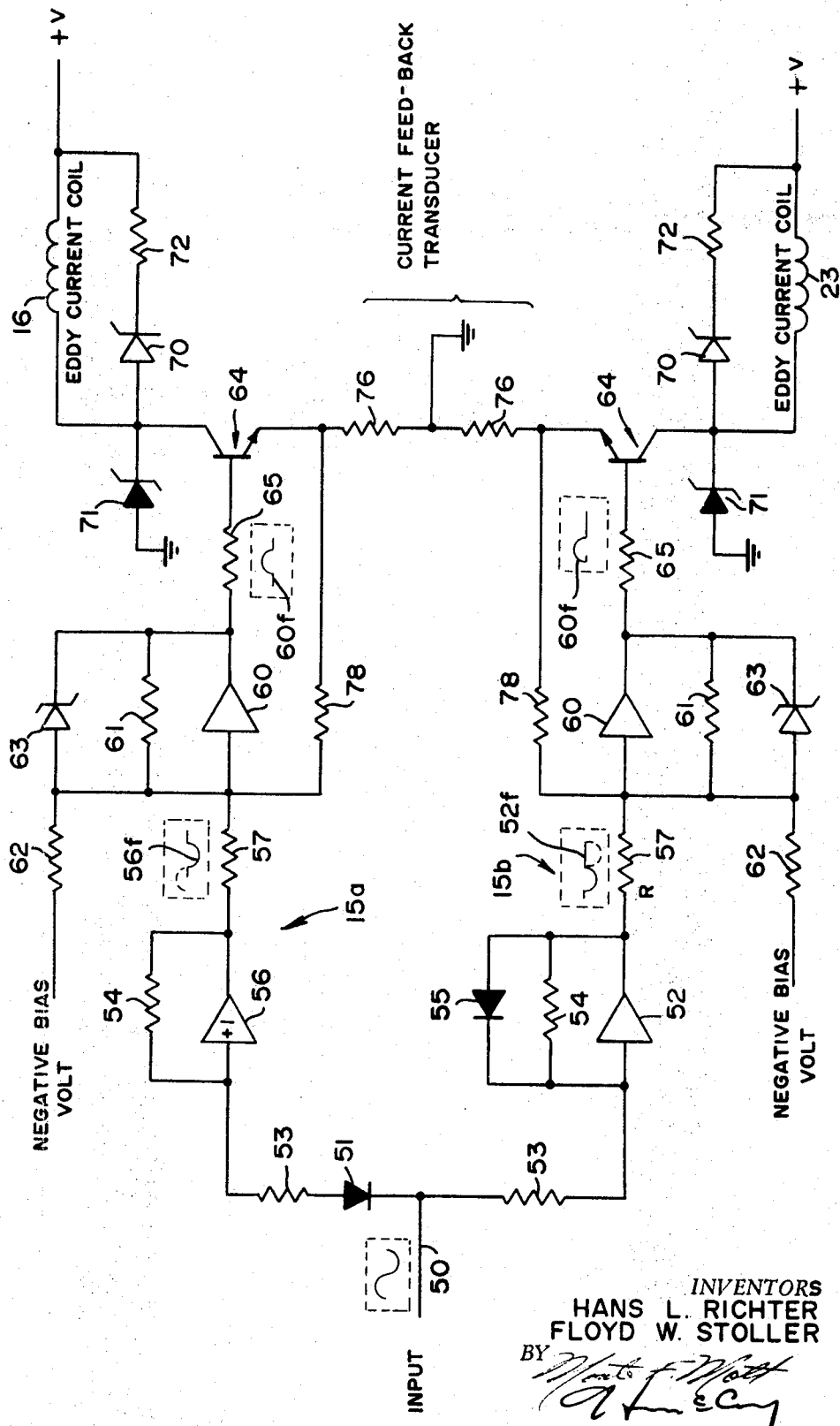

3,535,570
REVERSIBLE MOTION DRIVE SYSTEM
T. O. Paine, Acting Administrator of the National Aeronautics and Space Administration, with respect to an invention of Hans L. Richter, Arcadia, and Floyd W. Stoller, Pasadena, Calif.
Filed Feb. 4, 1969, Ser. No. 796,360
Int. Cl. H02k 49/00
U.S. Cl. 310—101     11 Claims

ABSTRACT OF THE DISCLOSURE

A drive system for driving a large parabolic tracking antenna in either of two opposite directions, at a uniform rate or in response to error signals is disclosed. The system incorporates a plurality of electrical loops including eddy-current energized actuators to produce the desired antenna motion, and a unique solid state RF interference free current feedback amplifier. The system includes a loop to provide antibacklash biasing and load rate compensation.

ORIGIN OF INVENTION

The invention described herein was made in the performance of work under a NASA contract and is subject to the provisions of Section 305 of the National Aeronautics and Space Act of 1958, Public Law 85—568 (72 Stat. 435; 42 USC 2457).

BACKGROUND OF THE INVENTION

1. Field of the invention

The present invention relates to a drive system, and more particularly, to a drive system for a relatively large structure, with refersible motion and minimal backlash characteristics.

2. Description of the prior art

There are many commercial and military applications in which a drive system, capable of responding to a plurality of parameters is needed to move a relatively large structure a specified distance in either of two directions, with a minimum of backlash. In commercial usage, such applications may include large machine tools, which are, typically, controlled by analog computing devices or digital analog systems. The military applications include the moving of structures, such as large size antennas, wherein reversible motion with high resolution, and essentially zero backlash is required. In the latter-mentioned application, in order not to interfere with the low level radio signals which may be received by the antenna, it is of primary importance that the drive system operate without generating electrical noise, so as not to interfere with the received radio signals. Although various drive systems have been proposed and designed in the prior art, none seems to provide all of the above-mentioned desired characteristics.

OBJECTS AND SUMMARY OF THE INVENTION

It is a primary object of the present invention to provide a new improved drive system.

Another object of the present invention is to provide a drive system for a relatively large structure, capable of providing reversible motion with a minimum of backlash.

A further object of the present invention is to provide an electrical drive system, finding particular use in moving a relatively large structure with a minimum of backlash, and without producing radio frequency (RF) noise interference.

These and other objects of the invention are achieved by providing a drive system which utilizes eddy-current energized actuators which effect the movement of the structure, such as, for example, a large parabolic tracking antenna, used in space exploration. Since one of the primary motivations for the present invention was the design of a drive system for use with such an antenna, where the drive system is substantially RF noise free, the invention will be described in connection with driving such an antenna. However, as will be appreciated from the following description, the teachings of the invention are not limited to driving an antenna only, but rather, are applicable for driving any relatively large structure in response to a plurality of parameters in either of two directions with a minimum of backlash.

The eddy-current actuators are free from RF interference generation. They are nearly true torque sources when driven by a unique solid state RF interference free current feedback amplifier, to be described hereafter in detail. The drive system has provisions for antibacklash biasing and lowered rate compensation for increased resistance to external disturbances on the antenna, whose motion is controlled by the novel drive system of the present invention.

The novel features of the invention are set forth with particularity in the appended claims. The invention will best be understood from the following description when read in conjunction with the accompanying drawings.

BRIEF DESCRIPTION OF THE DRAWINGS

FIG. 1 is an overall block diagram of the invention; and

FIG. 2 is a schematic diagram of a power amplifier, shown in FIG. 1.

DESCRIPTION OF THE PREFERRED EMBODIMENTS

Before proceeding to describe the invention in conjunction with the combination block and schematic diagram of FIG. 1, it would be helpful to regard the invention as consisting of primarily, four primary servo loops. Three of these are electro-mechanical loops and the fourth is an electrical current feedback loop. The three electro-mechanical servo loops include a motor-rate loop, a pinion-rate loop and a mode loop, the latter including velocity and position modes, whose function will be described hereafter in detail.

As shown in FIG. 1, the motor-rate loop includes a first eddy-current actuator arrangement, designated by number 11, a tachometer 12, a summing and compensating amplifier 14, represented by a summing circuit 14a and an amplifier and compensating stage 14b, and a power amplifier 15. The eddy-current actuator arrangement 11 includes an eddy-current coupling coil 16, connected to the output of power amplifier 15. The function of coil 16 is to control the amount of torque which is transferred from a constant speed electrical squirrel cage motor 17 to an eddy-current coupler 16c which is mechanically coupled to a gear box 18. The latter is mechanically coupled to a pinion gear 19 which provides the torque to drive an antenna 20. In FIG. 1, electrical connections are represented by solid lines, while mechanical linkages are represented by dashed lines.

Another part of the motor-rate loop which operates in opposition to the part just described, comprises a second eddy-current actuator arrangement 21, a tachometer 22 which is connected to the summing network 14a. Actuator arrangement 21 comprises an eddy-current coupling coil 23, which, like coil 16, is connected to respond to the output of power amplifier 15. The function of coil 23, like that of coil 16, is to control the torque transfer from a constant speed electrical squirrel cage motor 24 to an eddy-current coupler 23c and therefrom to gear box 25, which is mechanically coupled to the antenna by means of a pinion gear 26.

Such an arrangement accounts for the anti-backlash characteristics of the present invention, since at any given time power is applied to the dragging actuator arrangement when its opposite is driving the antenna. The direction of drive of the motor-rate loop which controls the direction of drive of the antenna is a function of the polarity of a bipolar DC signal, which is applied to the summing amplifier 14 on an input line 30.

In addition to the motor-rate loop, the present invention also includes a pinion-rate loop, whose main function is to provide for damping of the gear boxes 18 and 25, hereinbefore referred to, and to sense the motion of the antenna 20 as controlled by pinion gears 19 and 26. The pinion-rate loop, includes a tachometer 32 which is mechanically coupled to the pinion-gear 19. Similarly pinion gear 26 is coupled to a tachometer 34, whose output, representing the rate of speed, together with the output of tachometer 32 are supplied and summed in a summing amplifier 35. The output of summing amplifier 35 closes the pinion-rate loop either through a summing and compensating amplifier 39, or through a relay 40 and an integrator 41.

The relay 40, diagrammed as a switch, as well as relays 42 and 43 form part of the mode loop. The system of the present invention, is operable in either a position mode or a velocity mode. In the position mode, an error signal is received from either a computer or a receiver in order to control and position the antenna to a desired position. Contacts 42a and 42b of relay 42 control the supply of the error signal from either the computer or the receiver, neither one of which is shown, since they do not form part of the invention, to integrator 41. When a constant rate of pinion movement is required to produce a uniform constant rate of movement of the antenna 20, the system is operated in the velocity mode in which a reference voltage is supplied to integrator 41 through relay 43.

As diagrammed in FIG. 1, the system is assumed to operate in the position mode with the error signal being received from a computer and supplied to the integrator 41 through contacts 42a of relay 42. The mode loop also includes a mode control relay 45 to which the output of integrator 41 is supplied via a line 46 and the output of the summing and compensating amplifier 39 is supplied via line 47. When the system is operating in the position mode, as diagrammed in FIG. 1, relay 45 provides a continuous path between line 47 and line 30 so as to supply to the motor rate loop the output of summing amplifier 39. However, when the system is operated in the velocity mode, relay 45 connects line 46 to line 30, so as to supply the output of integrator 41 to line 30.

From the foregoing it should thus be seen, that in the position mode of operation, the pinion-rate signal, representing the output of summer 35, is summed in unit 39 with the integrated position error signal from integrator 41. The error signal is provided either by the computer or the receiver, via relay 42. However, in the velocity mode, when a constant rate of pinion movement or antenna motion is desired, the output of summer 35 is summed and integrated in integrator 41 with the reference voltage, provided through relay 43 to produce the necessary signal for precise antenna rate control. Actually, in the latter-mentioned mode, the antenna is driven at a rate which is governed by the pinion-rate loop, which includes tachometers 32 and 34 and the reference voltage, supplied to the system.

As previously indicated, one of the major advantages of the present invention is its RF interference free characteristics which is provided by the power amplifier 15. The operation of the amplifier may best be described in conjunction with the combination block and schematic diagram of FIG. 2, to which reference is made herein. Therein, numeral 50 represents the amplifier's input line which is connected to the output of the summing and compensating amplifier 14. The amplifier may be thought of as consisting of two, nearly identical channels which are designated 15a and 15b in FIG. 2.

Assuming that the input signal which enters at line 50 is, for example, a sinewave, the upper channel 15a includes a diode 51 which inhibits the positive half cycle of the input signal from entering the upper channel 15a. Such positive half cycle enters an inverting amplifier 52 through an input resistor 53. A feedback resistor 54 and a diode 55 are connected across the inverting amplifier 52. As a result, the positive half cycle of each input signal at input line 50 is amplified and inverted. The output of amplifier 52 is represented by waveform 52f.

Similarly, the negative half cycle of each input signal passes through diode 51 and through a second resistor 53 to a noninverting amplifier 56, across which a feedback resistor 54 is connected. Since the two channels 15a and 15b include similar elements, performing identical functions, such elements are designated by like numerals.

The negative half cycle, existing at the output of amplifier 56 and which is designated in FIG. 2 by the waveform 56f, is supplied through a resistor 57 to an amplifier 60. A feedback resistor 61 is connected across amplifier 60 while a bias controlling resistor 62 is connected between the input of amplifier 60 and a source of biasing voltage (not shown). A voltage limiting diode, such as Zener diode 63 is connected across amplifier 60, whose output 60f, is supplied to the base of a transistor 64 through a resistor 65. In the particular embodiment, transistor 64 is shown to be of the NPN type. Its collector is connected to the eddy-current coil 16, hereinbefore referred to (see FIG. 1), which is also connected to a source of positive potential, generally designated by +V.

The arrangement also incorporates a diode 70 and a Zener diode 71, which are used to limit voltages which result from energy stored in the inductance of coil 16, and thereby prevent damage to the transistor, by inhibiting excessive voltages from being applied there- 72 which together with diode 70 is connected across coil 16. The emitter of transistor 64 is connected to a reference potential, such as ground through a resistor 76, as well as to a resistor 78 whose other end is connected to resistor 57 and the input of amplifier 60.

Resistors 57 and 78 may be thought of as summming resistors, while resistor 76 may be thought of as a current feedback resistor, since the voltage thereacross is fed back through resistor 78 to the input of amplifier 60. Thus the output of noninverting amplifier 56 is combined with the feedback signal to provide a voltage at the input of amplifier 60. The latter is amplified to drive transistor 64 which in turn excites the eddy-current coil 16. An identical set of components is included in channel 15b which is designed to utilize the output of inverting amplifier 52 and combines it with a feedback signal to excite the other eddy-current coil 23.

The advantages of an amplifier such as amplifier 15 are three fold.

1. It is linear.
2. It allows for widening the bandwidth of the current response of a highly inductive load.
3. It allows for independent bias adjustment of two unidirectional torque (or speed) sources.

The amplifier is linear in that each half is operated in its linear range by means of a bias which is completely independent of the incoming signal because of the isolation amplifiers 52 and 56 and the bias voltage source. This independent biasing also allows independent biasing of each actuator for purposes of torque biasing.

The other advantage offered by the amplifier is manifested in the current feedback loop which it incorporates. This allows widening the current response bandwidth which is one of the limiting factors in the design of control loops where large inductances or rather large inductance time constants are involved.

This advantage may be better understood and amplified by considering the current loop in one channel of the amplifier, such as 15a, neglecting the bias voltage and by assuming that the collector current $I_c$ and emitter current $I_e$ in transistor 64 are about equal and that the resistance of resistor 78, designated $R_{78}$, is much greater than the resistance of resistor 76, designated $R_{76}$. Also, it is assumed that the colletor current $I_c$ is much greater than the base current $I_b$. Designating E as the output of amplifier 60, the base current may be expressed as $$I_b = \frac{E_1}{R_{65} + \beta R_{76}} = \frac{E_1}{R_{eq}}$$

where $R_{65}$ is the resistance of resistor 65 and $\beta$ is the transistor's current gain.

Considering the channel as a differencing device in whihc the feedback current is negative feedback, it can be shown that $$\frac{I_c}{E_{in}} = \frac{K_A \beta}{(R_{eq} + K_A \beta R_{76})\left(\frac{R_{eq}\tau}{R_{eq} + K_A \beta R_1} S + 1\right)}$$

where $K_A$ is the gain of amplifier 60, $\tau$ is the coil's time constant, equalling its inductance over its resistance, and S is the Laplac transform operator. From the above equation it is seen that the coil's time constant can be decreased by the ratio $$\frac{R_{eq}}{R_{eq} + K_A \beta R_1}$$

which will always be less than one. By choosing the gain $K_A$ of amplifier 60, the time constant $\tau$ of the coil 16 may be set to any desired value.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. A drive system for controlling the positioning of a body by controllably rotating it in either of two opposite directions comprising:
   a first element responsive to mechanical power supplied thereto for controlling the rotation of said body in a first direction, a second element responsive to mechanical power supplied thereto for controlling the rotation of said body in a second direction opposite said first direction;
   first and second eddy-current coupler means coupled to said first and second elements respectively for supplying mechanical power thereto; and
   control means for controlling said first and second eddy-current coupler means as a function of an input signal and the mechanical power supplied to said first and second elements.

2. The drive system as recited in claim 1 wherein each of said first and second elements is a rotatable gear and each of said first and second eddy-current coupler means includes a source of rotary motion, an eddy-current coupler mechanically coupled to its respective gear through respective gearing means and a control eddy-current winding for controlling the rotary power supplied from its respective source to the eddy-current coupler thereof, and a tachometer coupled to the output of the eddy-current coupler for providing a signal indicative of the rate of rotary power supplied by said eddy-current coupler to its respective gearing means.

3. The drive system as recited in claim 2 wherein said control means includes first summing means for controlling the energization of the eddy-current windings in said first and second eddy-current coupler means as a function of said input signal and the signals from the tachometers in said first and second eddy-current coupler means.

4. The drive system as recited in claim 3 further including first and second tachometers mechanically coupled to said first and second gears respectively and second summing means for providing an output as a function of the outputs of said first and second tachometers.

5. The drive system as recited in claim 4 further including input means for combining a received error signal with the output of said second summing means to provide said control means to control the position of said body as a function of the error signal.

6. The drive system as recited in claim 5 further including means for combining said second summing means output with a reference signal, for integrating the two and for providing the integrated output to said control means to control the position of said body to vary at a uniform rate, related to said reference signal.

7. A drive system for controllably rotating a body in either of two opposite directions, comprising:
   a first drive gear coupled to said body for rotating the body in a first direction;
   first tachometer coupled to said first drive gear for providing a signal which is a function of the rotation of said first drive gear;
   a second drive gear coupled to said body for rotating the body in a second direction, opposite said first direction;
   a second tachometer coupled to said second drive gear providing a second signal which is a function of the rotation of said second drive gear;
   first summing means for providing a first output signal which is a function of the signals from said first and second tachometers;
   drive means coupled to said first and second drive gears for driving either of said gears in either of said two opposite directions as a function of a control input signal; and
   input means for receiving an input signal and for combining it with said first output signal to provide said drive means with said control input signal.

8. The arrangement as recited in claim 7 wherein said input means include first means for integrating an input signal representing a desired correction of the position of said body and second means for combining said integrated input signal with said first output signal to provide said control input signal.

9. The arrangement as recited in claim 7 wherein said drive means include first and second eddy-current coupler means coupled to said first and second drive gears respectively, each of said first and second eddy-current coupler means includes a source of rotary motion, an eddy-current coupler mechanically coupled to its respective gear through respective gearing means and a control eddy-current winding for controlling the rotary power supplied from its respective source to the eddy-current coupler thereof, and a tachometer coupled to the output of the eddy-current coupler for providing a signal indicative of the rate of rotary power supplied by said eddy-current coupler to its respective gearing means.

10. The arrangement as recited in claim 9 wherein said drive means includes an amplifier having first and second channels respectively, each channel including amplifying means coupled to one of said eddy-current windings and responsive to said control input signal to control the current supplied to the eddy-current winding so as to control the rotary power supplied to the drive gear with which the eddy-current coupler means is associated.

11. The arrangement as recited in claim 10 wherein said input means include first means for integrating an input signal representing a desired correction of the position of said body and second means for combining said integrated input signal with said first output signal to provide said control input signal.

References Cited

UNITED STATES PATENTS 2,159,142   5/1939   Fischer            310—101 X
3,202,895   8/1965   Arp et al.         310—101 X DAVID X. SLINEY, Primary Examiner U.S. Cl. X.R.

310—95